Jan. 16, 1923. 1,442,626.
C. E. McGEE.
CASING COUPLING REMOVER.
FILED AUG. 8, 1921.
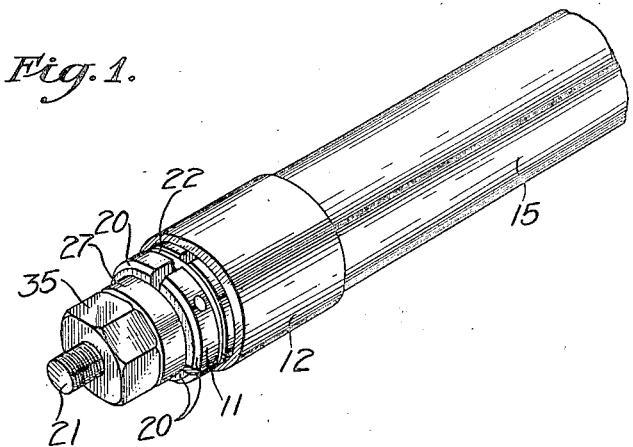
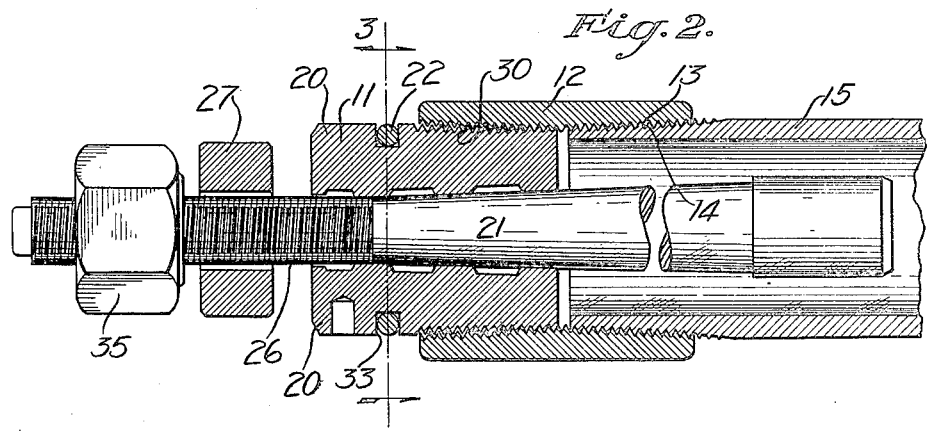
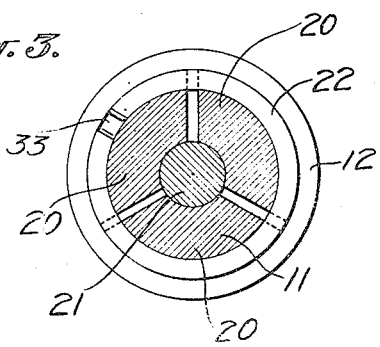
INVENTOR:
CHARLES E. McGEE,
BY
Graham S Harris
Attorneys.

Patented Jan. 16, 1923.

1,442,626

UNITED STATES PATENT OFFICE.

CHARLES E. McGEE, OF SANTA MONICA, CALIFORNIA, ASSIGNOR OF ONE-HALF TO R. E. SMALL, OF LOS ANGELES, CALIFORNIA.

CASING-COUPLING REMOVER.

Application filed August 8, 1921. Serial No. 490,561.

*To all whom it may concern:*

Be it known that I, CHARLES E. McGEE, a citizen of the United States, residing at Santa Monica, in the county of Los Angeles and State of California, have invented a new and useful Casing-Coupling Remover, of which the following is a specification.

This invention relates to tools and equipment employed in pipe fitting, and relates particularly to well drillers' equipment.

It is common practice in the installation of certain classes of piping to join lengths of pipe together by the use of members which are commonly designated as couplings. These couplings after having been in use for a period of time are very difficult to remove.

It is very difficult and sometimes impossible to remove couplings in the field using standard pipe tongs and it is common practice to ship the pipe into the shop where the collars are removed in a pipe machine or lathe. This requires considerable trucking and expense and it is an object of my invention to provide a device which may be conveniently transported to a point where the services of such an article is required and which will remove the couplings with a comparatively small expenditure of force.

In the ordinary methods of removing couplings the pipe is turned inside the coupling or the coupling is turned on the pipe with the coupling gripped about its periphery by pipe tongs or the like. This tends to compress the coupling on the pipe and to increase the natural tendency of the collar to "seize" on the pipe threads with the result that these threads are often stripped from the pipe necessitating rethreading which can only be economically done in the shop.

It is a further object of my invention to provide a device which will engage the coupling inside its bore pressing outwardly thereon and expanding the coupling and thus reducing the pressure on the threads and the tendency to seize upon and strip threads. This is quite necessary as a portable coupling remover would be valueless unless the pipe were left in such condition that new couplings could be immediately put on the old threads without the necessity of sending the pipe into the shop for rethreading.

Other objects and advantages will be made evident hereinafter.

Referring to the drawings which is for illustrative purposes only:

Fig. 1 is a perspective view of a coupling remover embodying my invention in the operation of removing a coupling from a length of casing.

Fig. 2 is a longitudinal vertical section through the coupling remover in operation as shown in Fig. 1.

Fig. 3 is a section taken on a plane represented by the line 3—3 of Fig. 2.

As shown in the drawing, my invention comprises a head 11 which expands inside a coupling 12 to such an extent that the binding engagement between the threads 13 thereof and the threads 14 upon the pipe 15 is broken, thus making it possible for the coupling 12 to be unscrewed from the pipe 15.

The expansible head 11 may be conveniently formed of a trio of sector jaws 20, these sectors being held upon an expanding bar 21 by a circular spring 22 which rests in a circumferential groove 33 formed in the jaws 20. The head 11 which is comprised of the jaws 20 is provided with a screw thread 30 of the same standard pitch as the thread 31 of the coupling upon which its use is intended, but of a slightly less degree of taper than the coupling thread in order that the expansive force may be applied at a point near the engaged threads 13 and 14.

The jaws 20 of the head 11 are bored to correspond to the taper of the bar 21, and as the bar 21 is drawn into the head 11, an enormous expansive force is exerted by the jaws 11 upon the interior of the coupling. The drawing of the bar 21 into the head 11 is accomplished by screwing up a nut 35 upon the threaded portion 26 of the bar 21, the action of the nut 35 being exerted upon a collar 27 and through which the pressure is transferred to the head 11. It is preferable to use a left hand thread at 26 for reasons which will become evident in the following description of the operation of the coupling remover.

In the operation of the coupling remover the nut 35 is first screwed back to a point near the extremity of the bar 21 as shown in Fig. 2, and the head 11 is drawn back to the reduced portion of the coupling, whereupon the tool is ready for insertion in the coupling in the manner illustrated in Fig. 1. Considerable rotative force is required to screw up the nut 35 owing to the resistance of the coupling against expansion, and it will be perceived that as the expansion of the coupling progresses, there will be approached a point where the resistance of the friction in the threads against the turning of the coupling will become reduced due to the separation of the engaged threads, and that when this resistance becomes sufficiently relieved the rotative force applied in a left hand direction upon the nut will then be exerted in unscrewing the coupling from off the pipe, as the threads thereof are of right hand advance.

I claim as my invention:

1. A method of removing a coupling from the end of a pipe which comprises: expanding the coupling to stretch same and partially free the threads; and, while said coupling is expanded, subjecting it to a rotative force to unscrew it from the pipe.

2. A device for removing a threaded coupling from the end of a pipe comprising: threaded members adapted to go inside said coupling and to cooperate with the threads of the coupling; means for expanding said members to stretch said coupling and free the threads thereof which engage the threads of the pipe; and means for rotating said coupling while still expanded.

3. A device for removing a threaded coupling from the end of a pipe comprising: threaded members adapted to go inside said coupling and to cooperate with the threads of the coupling; a tapered bar fitting inside said members and so shaped as to expand said members when pulled outwardly; a left hand thread on said bar; and a left hand nut engaging said thread and abutting on said members.

4. A device for removing a threaded coupling from the end of a pipe comprising: members adapted to fit inside said coupling; a tapered bar fitting inside said members and so shaped as to expand said members when pulled outwardly; a left hand thread on said bar; and a left hand nut engaging said thread and abutting on said members.

5. A device for removing a right handed threaded coupling from the end of a pipe comprising: members adapted to fit inside said coupling; a tapered bar fitting inside said members and so shaped as to expand said members when pulled outwardly; a left hand thread on said bar; and a left hand nut engaging said thread and abutting on said members.

In testimony whereof, I have hereunto set my hand at Los Angeles, California, this 1st day of August, 1921.

CHARLES E. McGEE.